United States Patent [19]

Yamagishi

[11] 3,972,745

[45] Aug. 3, 1976

[54] NI-FE-AL MATERIAL HAVING HIGH MAGNETIC PERMEABILITY

[75] Inventor: Tomoo Yamagishi, Hamamatsu, Japan

[73] Assignee: Nippon Gakki Seizo Kabushiki Kaisha, Japan

[22] Filed: Mar. 4, 1975

[21] Appl. No.: 555,303

Related U.S. Application Data

[63] Continuation-in-part of Ser. No. 358,473, May 9, 1973, abandoned.

[30] Foreign Application Priority Data

June 2, 1972 Japan .............................. 47-55442

[52] U.S. Cl. ............................... 148/31.55; 75/170; 75/171; 148/31.57; 148/121

[51] Int. Cl.$^2$ ......................................... C04B 35/00

[58] Field of Search ............. 148/31.55, 31.57, 103, 148/121; 75/170, 171

[56] References Cited

UNITED STATES PATENTS

| | | | |
|---|---|---|---|
| 1,910,309 | 5/1933 | Smith et al. | 148/31.55 |
| 3,743,550 | 7/1973 | Masumoto et al. | 148/31.55 |

FOREIGN PATENTS OR APPLICATIONS

| | | | |
|---|---|---|---|
| 278,454 | 10/1927 | United Kingdom | 75/170 |

OTHER PUBLICATIONS

Bozorth, R.; *Ferromagnetism;* New York, 1951, pp. 184–185 and 385–388.

*Primary Examiner*—Walter R. Satterfield
*Attorney, Agent, or Firm*—Cushman, Darby & Cushman

[57] ABSTRACT

By the inclusion, by weight, of 1–5% of aluminium, as the essential additive, in a 78 permalloy (an Fe-Ni alloy) having a basic composition comprising the two essential elements, i.e. 75–82% of nickel and 5–24% of iron, the hardness of this alloy is improved without deteriorating the magnetic characteristic including magnetic permeability of the alloy. Furthermore, molybdenum, copper, chromium, and niobium may be added together with the aluminum in a suitable combination and amount to enhance both the hardness and characteristic of the alloy, facilitating the heat treatment during the manufacture of the material of this invention. This improved material or alloy is obtained in a relatively simple procedure and is of a good workability and is suitable for use as the material of head cores of magnetic recording apparatuses.

5 Claims, 4 Drawing Figures

NI-FE-AL MATERIAL HAVING HIGH MAGNETIC PERMEABILITY

RELATED APPLICATION

This application is a continuation-in-part of U.S. Pat. application Ser. No. 358,473, filed May 9, 1973 now abandoned, the disclosure of which is incorporated herein by reference.

BACKGROUND OF THE INVENTION

1. Field of the Invention

The present invention is concerned with an improvement of the material having a high magnetic permeability.

2. Description of the Prior Art

As a material having a high magnetic permeability for use in magnetic recording, there has been known, of all kinds of Fe-Ni alloys, an alloy called 78 permalloy consisting, for example, of a basic composition which consists of, by weight, 75–82% of nickel, 2–6% of molybdenum, 1% or less of manganese, 1% or less of silicon and the remainder being iron. This 78 permalloy is generally accepted from the viewpoints of manufacturability of an alloy, machinability and workability of the material and the magneticc characteristic, and is used frequently as the material of head cores of tape recorders. This alloy, however, is not of a very high hardness, so that when head cores made of this alloy are used, their resistance to wear caused by friction are not necessarily satisfactory. Of late in particular, there is an increasing tendency that, in the magnetic tapes designed for recording signals through head cores, the conventional powder of the magnetic material in a vehicle which has been applied as a thin layer to the entire surface of a magnetic tape is being replaced by the use of alloys of chromium group having a relatively high hardness, in order to improve the magnetic characteristic of same. In order to use such a magnetic tape, the head cores accordingly are required to have a more satisfactory resistance to wear from friction. Thus, there has been an increasing demand for an alloy satisfying these requirements.

SUMMARY OF THE INVENTION

It is, therefore, an object of the present invention to meet such a demand and to provide an alloy having a high magnetic permeability, which is given an improved resistivity to wear from friction by enhancing its hardness without deteriorating its magnetic characteristic by the inclusion of aluminum, and which has a good workability allowing an ingot of this alloy to be rolled to a very thin plate. It has been discovered that Nb, Si and/or Cr, when used in combination with aluminum, as additives to Ni-Fe base compositions, results in an alloy of improved hardness over the base alloy exclusive of these components.

Another object of the present invention is to provide an alloy of the type described, made with a basic composition comprising the two essential elements, i.e. 75–82% by weight of nickel and 5–24% by weight of iron, and being associated with 0–1% by weight of manganese and 0–1% by weight of silicon (both for the prevention of oxidation of the alloy), and the essential additive, aluminum, in an amount 1–5% by weight.

A further object of the present invention is to provide an alloy of the type described, made with said basic composition and with said essential additive, but further containing at least one additional additive which may be selected from the group consisting of molybdenum, copper, chromium, and niobium, to facilitate the heat treatment of the alloy during the manufacture and to enhance the magnetic characteristic thereof.

DETAILED DESCRIPTION OF THE PREFERRED EMBODIMENTS

Figure 1:
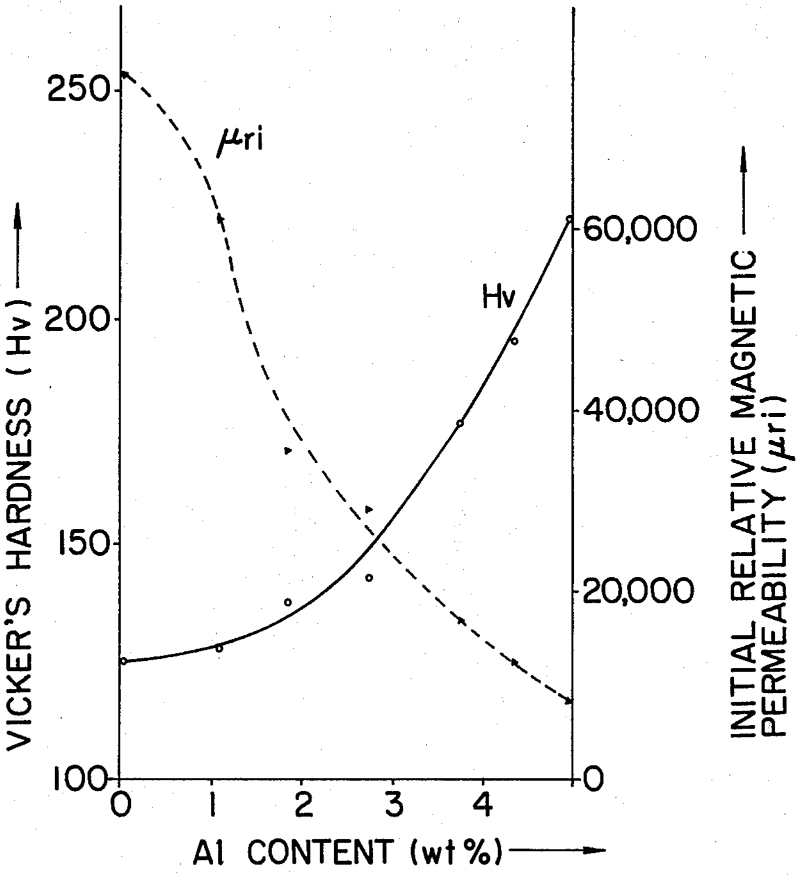
FIG. 1 is a chart showing the manner in which the magnetic characteristic and the hardness of the alloy of the present invention undergo changes depending on the amount of the content of aluminum which is the essential additive.

The present invention will hereunder be explained in further detail in connection with some examples. All percents are by weight, unless expressed to the contrary.

EXAMPLE 1

A mixture of the starting materials, i.e. Ni, Mo, Al, Mn and Fe, in required amounts respectively, was melted in a vacuum induction furnace at a pressure of $10^{-2}$ mm Hg or less and an ingot of permalloy of 40mm × 100mm × 150mm was prepared. The analysis of the composition of this alloy revealed the composition as consisting of 79% of nickel, 4% of molybdenum, 3% of aluminum, 0.5% of manganese and the remainder iron. Next, this alloy ingot was processed by forging and rolling into a thin plate of 0.35 mm in thickness. Thereafter, this thin plate was punched to prepare a ring-like core of 45 mm in outer diameter and 33 mm in inner diameter. Furthermore, this ring was annealed in highly pure hydrogen currents at 1,100°C for 2 hours. Thereafter, the resulting ring was measured of its magnetic characteristic. The result was: initial relative magnetic permeability $\mu_{ri}$=14,000, maximum relative permeability $\mu_{rm}$=56,000, coercive force $H_c$=2.80 A/m, and density of magnetic flux $B_{10}$=0.72 T (tesla) at 800 A/m of the intensity of magnetic field. Vicker's hardness revealed $H_v$ =180.

EXAMPLE 2

In a manner substantially the same as that for Example 1, a thin alloy plate having the composition consisting of 79% of Ni, 4% of Mo, 3% of Al, 0.5% of Mn, 2% of Nb and the remainder being Fe was prepared. Next, this thin plate was punched to obtain a ring-like core having the outer diameter of 45 mm and the inner diameter of 33 mm. Furthermore, this ring was annealed in highly pure hydrogen currents at 1,100°C for 2 hours. Thereafter, the magnetic characteristic of this ring was measured. The result was: $\mu_{ri}$=12,800, $\mu_{rm}$=55,000, $H_c$=3.20 A/m, and $B_{10}$=0.66 T. Vicker's hardness revealed $H_v$=230.

Further experiments revealed that the hardness of the Fe-Ni alloy comprising the two essential elements, that is, 75–82% by weight of nickel and 5–24% by weight of iron was remarkably increased by the addition of 1–5% by weight of aluminum. The reason why, in this invention, the hardness of the alloy increases by the inclusion therein of aluminum has not necessarily been elucidated. However, it is inferred that aluminum reacts with nickel to produce an inter-metallic compound in the form of $Ni_3Al$, and that due to the decomposition of this compound in the alloy, the hardness of the latter is augmented. The reason for setting the range of the amount of aluminum content, as the additive, to 1–5% is as follows. If the content is less than 17%, there does not appear a satisfactory effect of the inclusion of aluminum. On the other hand, if the content is in excess of 5%, the hardness of said alloy increases in accordance with the amount of aluminum included, but its magnetic characteristic lowers. Above all, said setting is made because of the finding that the initial relative magnetic permeability $\mu_{ri}$, among all items of the magnetic characteristic, takes a value smaller than 10,000 which is required of a head core material.

It has been discovered that a combination of aluminum with Nb, Si and/or Cr as additives to Ni-Fe base alloys results in an alloy of improved hardness as compared to the hardness of the base alloy exclusive of these components. Alloys of Tables I–IV represent alloys of the invention and include

| Element | % by Weight |
|---|---|
| Ni | 75 – 82 |
| Fe | 5 – 24 |
| Al | 1 – 5 |
| Mo | 0 – 6 |
| Mn | 0 – 1 |
| Cu | 0 or 3 – 15 |

and at least one additive, said additive being

| Element | % by Weight |
|---|---|
| Nb | 2 – 7 |
| Si | 0.4 – 2 and/or |
| Cr | 1 – 5 |

Figure 2:
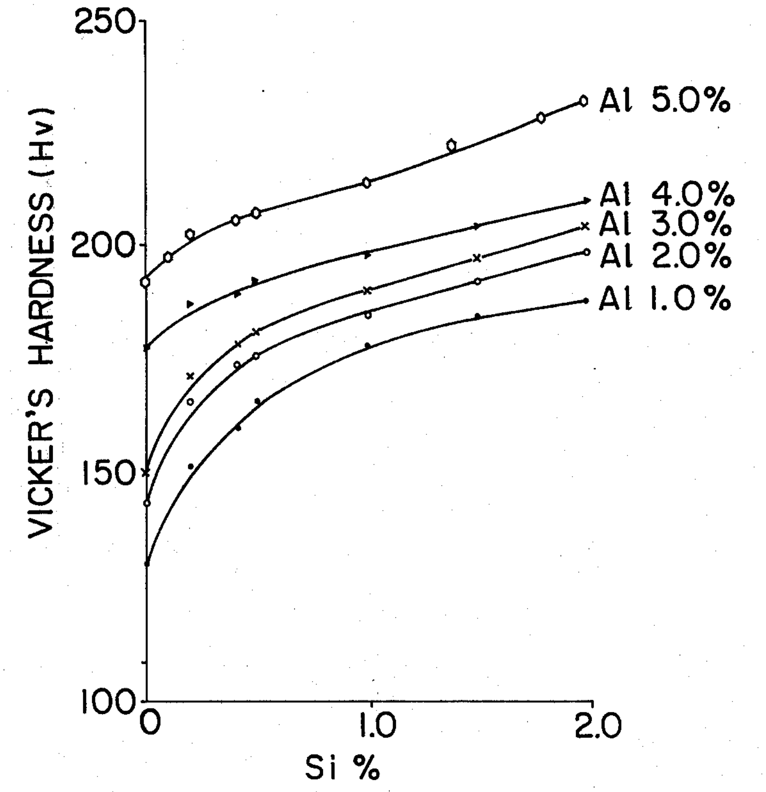
FIG. 2 is a chart showing the manner in which the hardness of the alloy of the present invention undergoes changes depending on the amount of the additive component silicon for the respective variations in the amount of aluminum included in the alloy.
Figure 3:
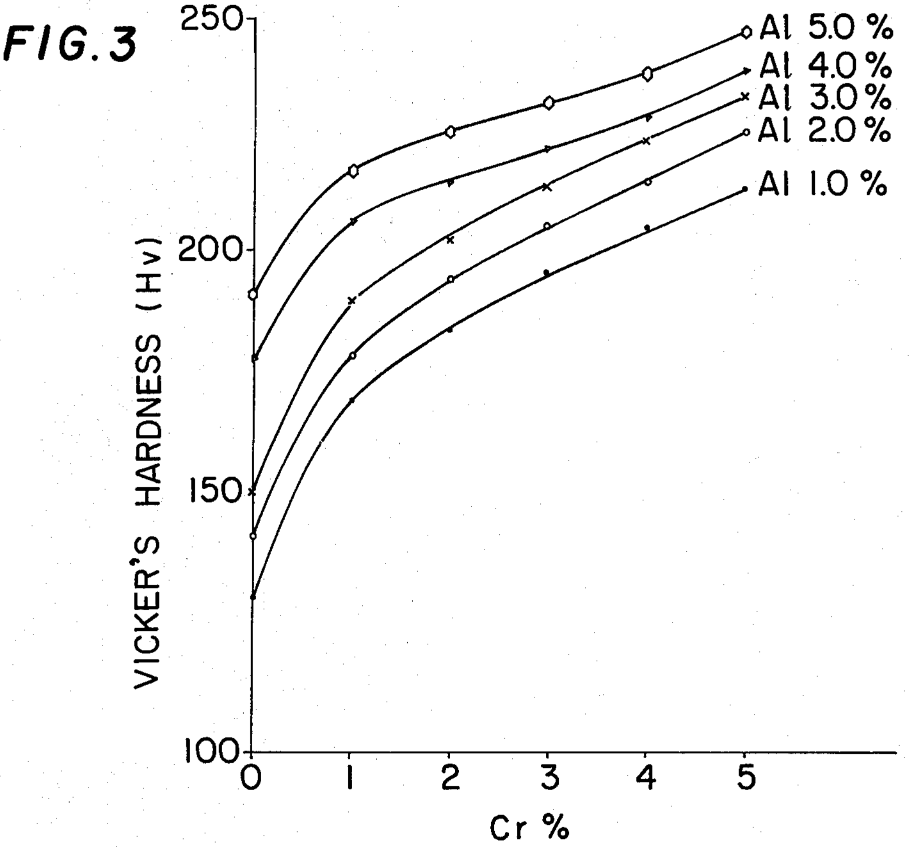
FIG. 3 is a chart similar to FIG. 2 showing the changes in hardness of the alloy with respect to the additive component chromium.
Figure 4:
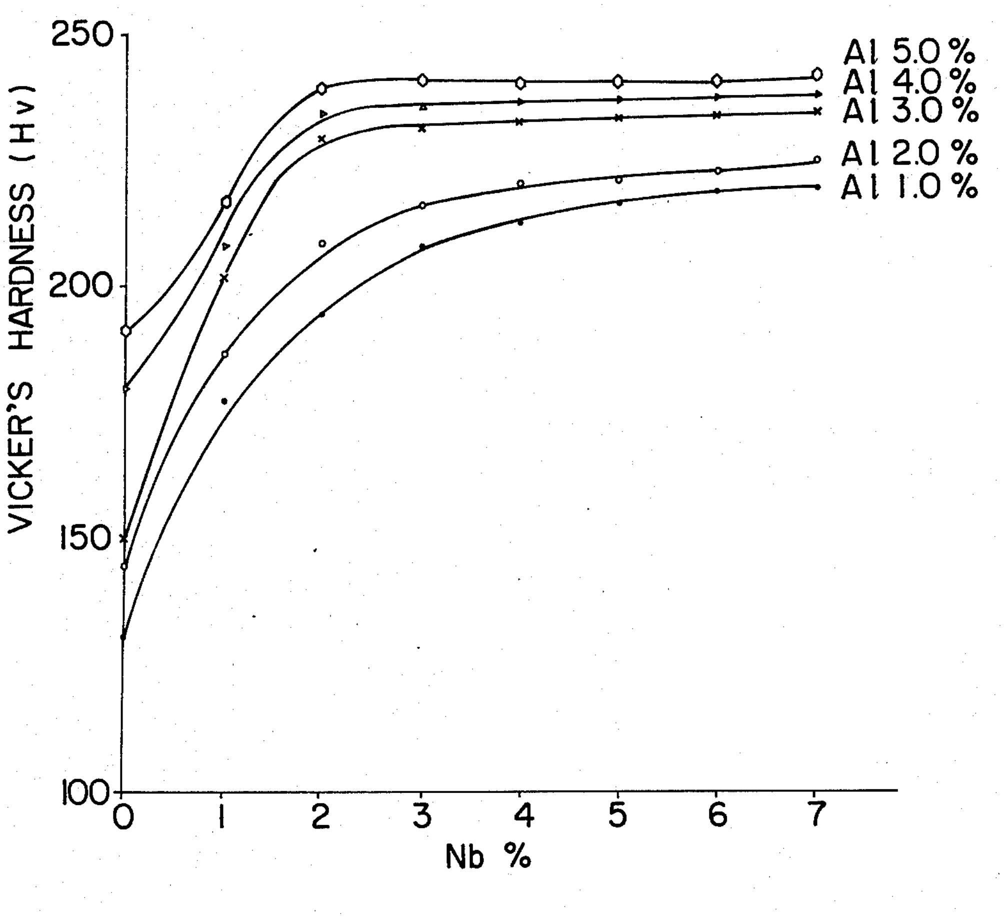
FIG. 4 is a chart similar to FIG. 2 showing the changes in hardness of the alloy with respect to the additive component niobium.

Chromium may be added to the base alloy as the sole additive or in combination with Nb. The resulting alloys of the invention have (1) Vicker's hardness values (Hv) of at least 160 and (2) $\mu_{ri}$ values of at least 10,000. The alloys of Tables I–IV are prepared in a manner substantially the same as the procedure of Example 1. FIGS. 2, 3 and 4 show the manner in which the hardness of the alloy of the present invention undergoes changes depending on the amount of the additive component silicon, chromium or niobium for the respective varying amount of aluminum included in this alloy.

TABLE I

LIST OF ALLOY COMPONENTS

| Al + Nb Combination | | | | | | | Results | | | |
|---|---|---|---|---|---|---|---|---|---|---|
| Al (%) | Nb (%) | Ni (%) | Fe (%) | Mn (%) | Mo (%) | Cu (%) | Hv | $\mu_{ri}$ | $\mu_{rm}$ | Hc (A/m) |
| 1 | 2 | 75.0 | 15.0 | 0.5 | 3.0 | 3.5 | 195 | 35,000 | 110,000 | 0.80 |
| 1 | 3 | 76.0 | 15.0 | 0.5 | 1.5 | 3.0 | 209 | 30,000 | 100,000 | 0.88 |
| 1 | 6 | 80.0 | 10.5 | 0.5 | 2.0 | | 218 | 28,000 | 96,000 | 1.00 |
| 1 | 7 | 80.0 | 9.5 | 0.5 | 2.0 | | 219 | 28,000 | 95,000 | 1.00 |
| 2 | 2 | 82.0 | 9.0 | 1.0 | 4.0 | | 209 | 26,000 | 98,000 | 1.04 |
| 2 | 7 | 79.0 | 9.0 | 1.0 | 2.0 | | 225 | 20,000 | 70,000 | 1.19 |
| 3 | 2 | 76.5 | 18.0 | 0.5 | | | 230 | 12,800 | 55,000 | 1.75 |
| 3 | 7 | 75.0 | 5.0 | 0.5 | 4.5 | 5.0 | 235 | 11,000 | 52,000 | 1.99 |
| 4 | 2 | 75.0 | 15.0 | 1.0 | 3.0 | | 235 | 10,000 | 50,000 | 2.07 |
| 4 | 7 | 75.0 | 10.0 | 1.0 | 3.0 | | 239 | 10,000 | 50,000 | 2.23 |
| 5 | 2 | 80.0 | 9.0 | 1.0 | | 3.0 | 240 | 10,000 | 50,000 | 2.23 |
| 5 | 3 | 80.0 | 8.0 | | | 4.0 | 241 | 10,000 | 50,000 | 2.23 |
| 5 | 6 | 80.0 | 6.0 | | | 3.0 | 242 | 10,000 | 50,000 | 2.23 |
| 5 | 7 | 76.0 | 8.0 | 1.0 | | 3.0 | 243 | 10,000 | 50,000 | 2.23 |

TABLE II

| Al + Cr Combination | | | | | | | Results | | | |
|---|---|---|---|---|---|---|---|---|---|---|
| Al (%) | Cr (%) | Ni (%) | Fe (%) | Mn (%) | Cu (%) | Mo (%) | Hv | $\mu_{ri}$ | $\mu_{rm}$ | Hc (A/m) |
| 1 | 1 | 80.0 | 12.0 | 1.0 | 5.0 | | 170 | 60,000 | 150,000 | 0.72 |
| 1 | 2 | 80.0 | 11.0 | 1.0 | 5.0 | | 185 | 50,000 | 120,000 | 0.80 |
| 1 | 4 | 79.0 | 10.0 | 1.0 | 5.0 | | 205 | 32,000 | 96,000 | 1.59 |
| 1 | 5 | 78.0 | 10.0 | 1.0 | 5.0 | | 212 | 25,000 | 81,000 | 1.59 |
| 2 | 1 | 82.0 | 10.0 | 1.0 | | 4.0 | 180 | 50,000 | 115,000 | 0.88 |
| 2 | 2 | 81.0 | 10.0 | 1.0 | | 4.0 | 195 | 41,000 | 100,000 | 1.20 |
| 2 | 4 | 79.0 | 10.0 | 1.0 | | 4.0 | 213 | 32,000 | 92,000 | 1.75 |
| 2 | 5 | 75.0 | 13.0 | 1.0 | | 4.0 | 223 | 20,000 | 76,000 | 1.59 |

TABLE II-continued

| Al + Cr Combination | | | | | | | Results | | | |
|---|---|---|---|---|---|---|---|---|---|---|
| Al (%) | Cr (%) | Ni (%) | Fe (%) | Mn (%) | Cu (%) | Mo (%) | Hv | $\mu_{ri}$ | $\mu_{rm}$ | Hc (A/m) |
| 3 | 1 | 80.0 | 9.0 | 1.0 | 6.0 | | 190 | 45,000 | 100,000 | 1.11 |
| 3 | 2 | 79.0 | 9.0 | 1.0 | 6.0 | | 202 | 40,000 | 92,000 | 1.51 |
| 3 | 4 | 80.0 | 9.5 | 0.5 | | 3.0 | 221 | 28,000 | 85,000 | 1.91 |
| 3 | 5 | 80.0 | 7.5 | 0.5 | | 4.0 | 230 | 18,000 | 70,000 | 2.39 |
| 4 | 1 | 80.0 | 6.5 | 0.5 | 3.0 | 5.0 | 190 | 45,000 | 96,000 | 1.20 |
| 4 | 2 | 80.0 | 5.0 | 1.0 | 3.0 | 5.0 | 202 | 40,000 | 84,000 | 1.67 |
| 4 | 4 | 78.0 | 5.0 | 1.0 | 3.0 | 5.0 | 221 | 29,000 | 71,000 | 2.23 |
| 4 | 5 | 77.0 | 5.0 | 1.0 | 3.0 | 5.0 | 230 | 16,000 | 60,000 | 2.55 |
| 5 | 1 | 80.0 | 9.0 | 1.0 | | 4.0 | 215 | 40,000 | 80.000 | 1.59 |
| 5 | 2 | 80.0 | 9.0 | 1.0 | | 3.0 | 223 | 29,000 | 72,000 | 1.67 |
| 5 | 3 | 80.0 | 9.0 | 1.0 | | 2.0 | 230 | 18,000 | 67,000 | 1.83 |
| 5 | 4 | 78.0 | 9.0 | 1.0 | | 3.0 | 235 | 14,000 | 60,000 | 2.39 |
| 5 | 5 | 77.0 | 9.0 | 1.0 | | 3.0 | 243 | 10,000 | 50,000 | 2.79 |

TABLE III

| Al + Si Combination | | | | | | | Results | | | |
|---|---|---|---|---|---|---|---|---|---|---|
| Al (%) | Si (%) | Ni (%) | Fe (%) | Mn (%) | Mo (%) | Cu (%) | Hv | $\mu_{ri}$ | $\mu_{rm}$ | Hc (A/m) |
| 1 | 0.4 | 78.0 | 20.0 | 0.6 | | | 160 | 50,000 | 180,000 | 0.72 |
| 1 | 0.5 | 80.0 | 9.0 | 0.0 | 4.0 | 5.5 | 165 | 50,000 | 160,000 | 0.76 |
| 1 | 1.5 | 81.0 | 9.0 | 0.0 | 4.0 | 3.5 | 185 | 40,000 | 120,000 | 0.10 |
| 1 | 2.0 | 81.0 | 9.0 | 0.0 | 4.0 | 3.0 | 187 | 36,000 | 115,000 | 0.11 |
| 2 | 0.4 | 79.0 | 15.1 | 0.5 | 3.0 | | 173 | 50,000 | 150,000 | 0.96 |
| 2 | 0.5 | 79.0 | 15.0 | 0.5 | 3.0 | | 175 | 45,000 | 146,000 | 1.04 |
| 2 | 1.5 | 79.0 | 14.0 | 0.5 | 3.0 | | 192 | 40,000 | 130,000 | 1.11 |
| 2 | 2.0 | 79.0 | 13.5 | 0.5 | 3.0 | | 197 | 35,000 | 110,000 | 1.20 |
| 3 | 0.4 | 82.1 | 5.0 | 0.5 | 4.0 | 5.0 | 178 | 25,000 | 100,000 | 1.20 |
| 3 | 0.5 | 82.0 | 5.0 | 0.5 | 4.0 | 5.0 | 181 | 21,000 | 91,000 | 1.27 |
| 3 | 1.5 | 80.5 | 5.5 | 0.5 | 4.0 | 5.0 | 196 | 18,000 | 80,000 | 1.35 |
| 3 | 2.0 | 80.0 | 7.0 | 1.0 | 4.0 | 3.0 | 204 | 16,000 | 70,000 | 1.43 |
| 4 | 0.4 | 75.6 | 5.0 | 0.0 | | 15.0 | 190 | 15,000 | 65,000 | 1.27 |
| 4 | 0.5 | 75.0 | 5.0 | 0.5 | | 15.0 | 192 | 15,000 | 63,000 | 1.35 |
| 4 | 1.5 | 82.0 | 10.0 | 0.5 | | 2.0 | 204 | 14,000 | 60,000 | 1.35 |
| 4 | 2.0 | 80.0 | 10.0 | 0.5 | | 3.5 | 210 | 14,000 | 58,000 | 1.43 |
| 5 | 0.4 | 80.0 | 9.0 | 0.5 | 5.1 | | 205 | 12,000 | 55,000 | 1.59 |
| 5 | 0.5 | 80.0 | 9.0 | 0.5 | 5.0 | | 207 | 11,000 | 52,000 | 1.67 |
| 5 | 1.4 | 80.0 | 9.0 | 0.5 | 4.1 | | 222 | 10,000 | 50,000 | 1.83 |
| 5 | 2.0 | 80.0 | 9.0 | 0.5 | 3.5 | | 230 | 10,000 | 45,000 | 1.91 |

Al + Cr + Nb Additives to Fe—Ni Alloy

| Al (%) | Cr (%) | Nb (%) | Ni (%) | Fe (%) | Mn (%) | Mo (%) | Cu (%) | Hv (%) | $\mu_{ri}$ | $\mu_{rm}$ | Hc (A/m) |
|---|---|---|---|---|---|---|---|---|---|---|---|
| 2 | 2 | 2 | 79 | 11.5 | 0.5 | 3 | 0.0 | 215 | 24,000 | 80,000 | 1.27 |
| 4 | 1 | 2 | 79 | 10.5 | 0.5 | 3 | 0.0 | 240 | 10,000 | 50,000 | 2.39 |

In the above examples, molybdenum and niobium were added to the alloy for such reason as to facilitate the heat treatment of the alloy or to improve the magnetic characteristic of the same, but, instead thereof or in combination thereof, other additives such as copper and chromium may be used together with the essential additive of aluminum. A satisfactory result was obtained by selecting the amount of such auxiliary additives in the following ranges.

| | | |
|---|---|---|
| Mo | 0–6 | weight percent |
| Cu | 3–15 | weight percent |
| Cr | 1–3 | weight percent |
| Nb | 2–14 | weight percent |

These auxiliary additives may be used independently or in any combination. Following are some of such combination, including the case where one auxiliary additive is used independently.

a. Mo (4–6%);
b. Mo (4%), Cu (5%);
c. Mo (4%), Cu (14%);
d. Cr (2%), Cu (5%);
e. Nb (8%); and
f. Nb (3%), Mo (4%).

Each of the Fe-Ni alloys containing these auxiliary additives as well as aluminum were found to improve both the hardness and magnetic characteristics of the alloys.

It is to be understood that, in the present invention, the inclusion of aluminum which is the essential additive is intended for the improvement of the resistance to wear from friction, whereas the inclusion of molybdenum, copper, chromium and niobium are intended for facilitating the heat treatment during the process of manufacturing the alloy of the present invention and for the improvement of the magnetic characteristic of same.

On the other hand, the inclusion of manganese and silicon in the basic composition is intended for the prevention of oxidation of the alloy.

What is claimed is:

1. A high magnetic permeability heat-treated alloy for recording and reproducing heads, consisting essentially of

| Element | % by Weight |
|---|---|
| Ni | 75 – 82 |
| Fe | 5 – 24 |
| Al | 1 – 5 |
| Mo | 0 – 6 |
| Cu | 0 – 15 |

and at least one additive, said additive being

| Element | % by Weight |
|---|---|
| Nb | 2 – 7 |
| Si | 0.4 – 2 |
| Cr | 1 – 5 |

-continued

, or a mixture thereof wherein said $\mu_{ri}$ is at least 10,000 and said Hv is at least 160, said alloy having an initial relative magnetic permeability ($\mu_{ri}$) expressed in line $\mu_{ri}$ of FIG. 1 of the drawings and a Vicker's hardness (Hv) expressed by line Hv of FIG. 1 of the drawings as the aluminum content of the alloy increases from 1 to 5%.

2. The alloy of claim 1, wherein said Cu is present in amounts ranging between 3–15% by weight.

3. The alloy of claim 1, wherein said additive is Cr.

4. The alloy of claim 1 wherein said additive is Nb.

5. The alloy of claim 1 wherein said additive is Si.

* * * * *